United States Patent [19]

Weinhaus

[11] 4,286,354
[45] Sep. 1, 1981

[54] MEAT GRAIN TEMPLATE

[76] Inventor: Robert S. Weinhaus, 868 Albey La., St. Louis, Mo. 63132

[21] Appl. No.: 41,492

[22] Filed: May 22, 1979

[51] Int. Cl.³ .................. A22C 17/10; A22C 17/02
[52] U.S. Cl. .................................. 17/1 R; 17/52; 83/466.1; 83/762
[58] Field of Search .............. 83/466.1, 762; 17/1 R, 17/45, 52

[56] References Cited

U.S. PATENT DOCUMENTS

| | | | |
|---|---|---|---|
| 2,089,980 | 8/1937 | Owen | 83/762 |
| 2,652,087 | 9/1953 | Turpin | 83/762 |
| 3,935,779 | 2/1976 | Hildebrandt et al. | 83/762 |
| 4,095,500 | 6/1978 | Rouse | 83/762 |

Primary Examiner—Willie G. Abercrombie
Attorney, Agent, or Firm—Cohn, Powell & Hind

[57] ABSTRACT

This meat grain template is formed from a three-dimensional prism having a spaced upper end and lower faces. The lower face contacts the meat and inclined passages are provided lying on a common plane perpendicular to the lower face and extending through the prism to receive and direct grain markers into the meat. The upper end openings of the passages define at least one reference line by which the template may be rotated into correct alignment prior to insertion of the marker. A method of determining the direction of the meat grain for specific units of meat is disclosed which facilitates cutting the meat across the grain.

11 Claims, 31 Drawing Figures

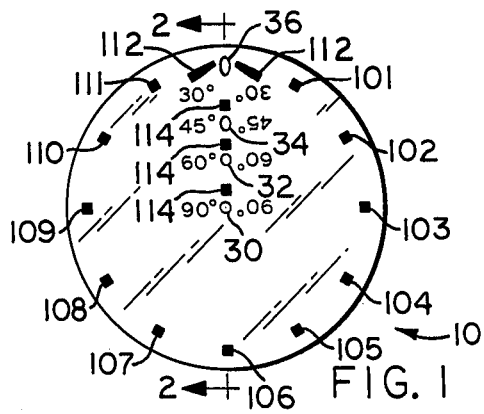
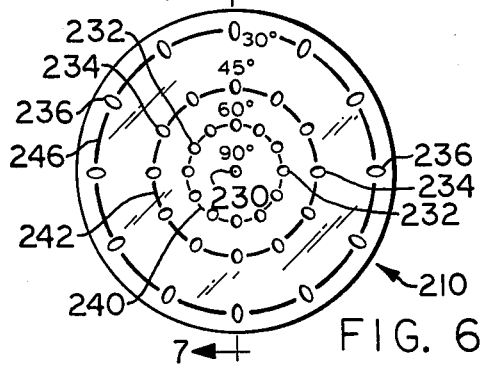
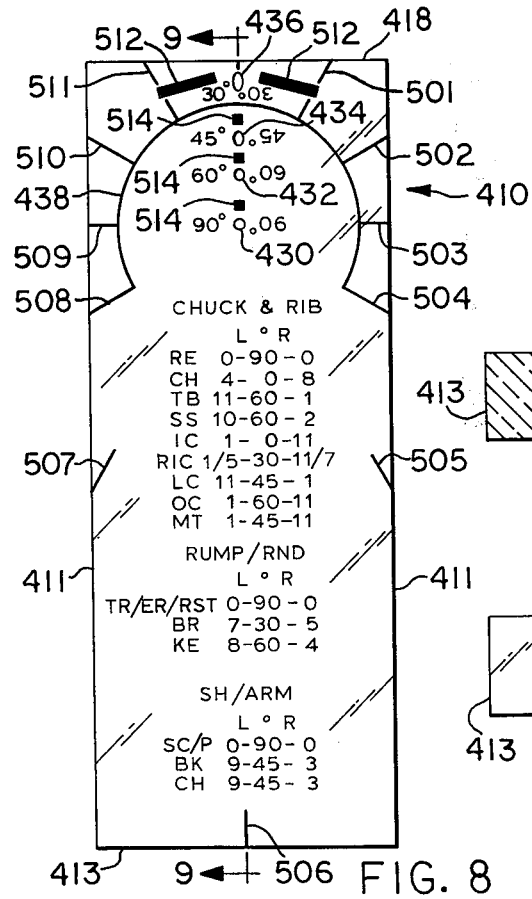
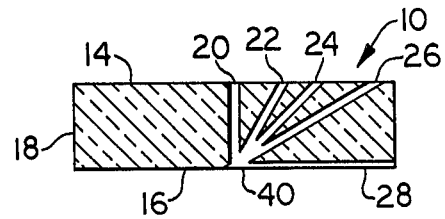
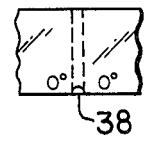
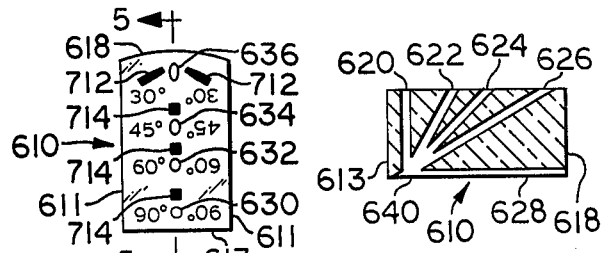
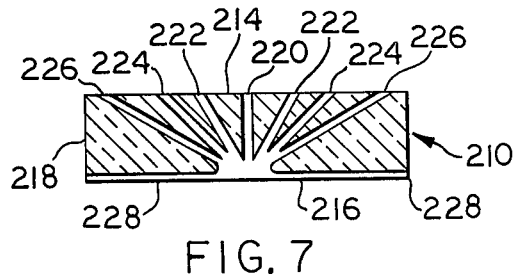
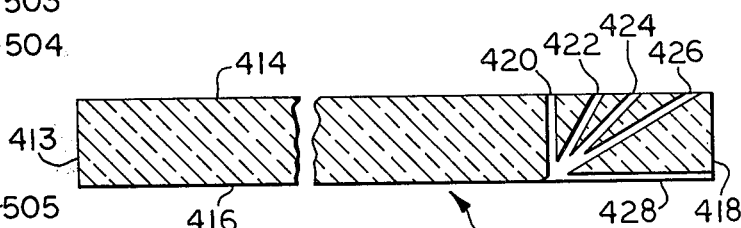
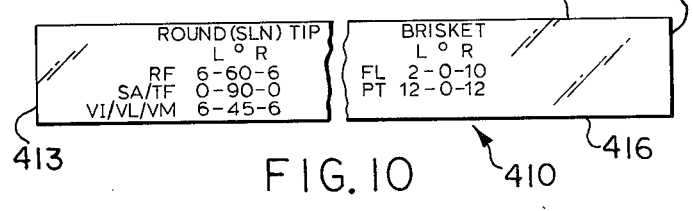

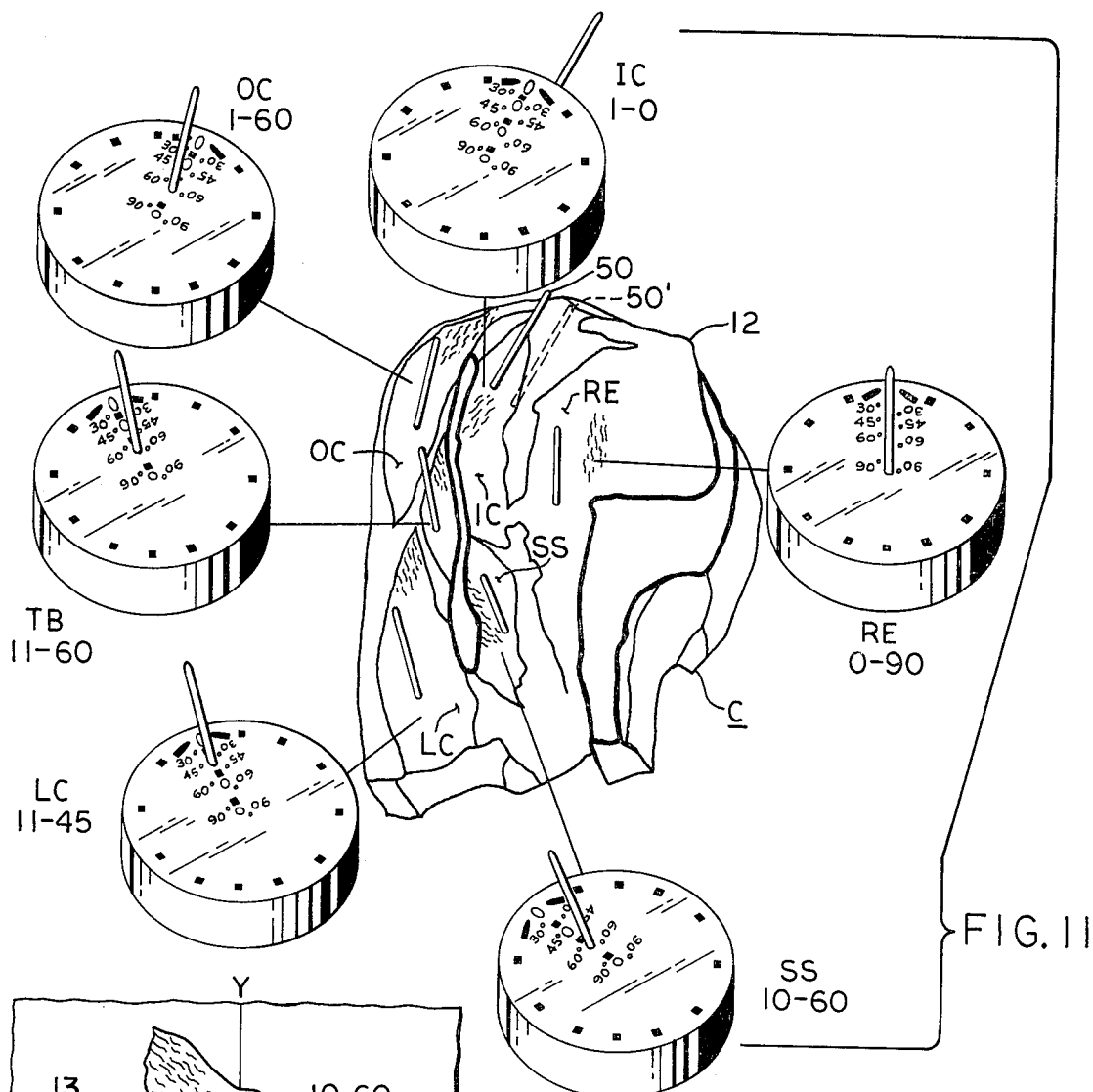
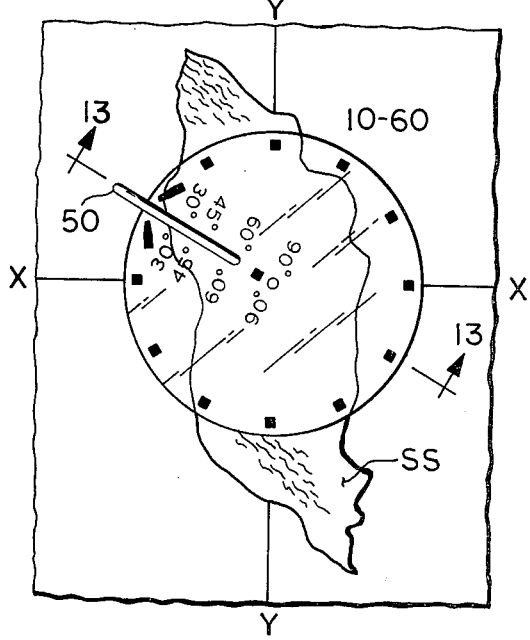
FIG. 12
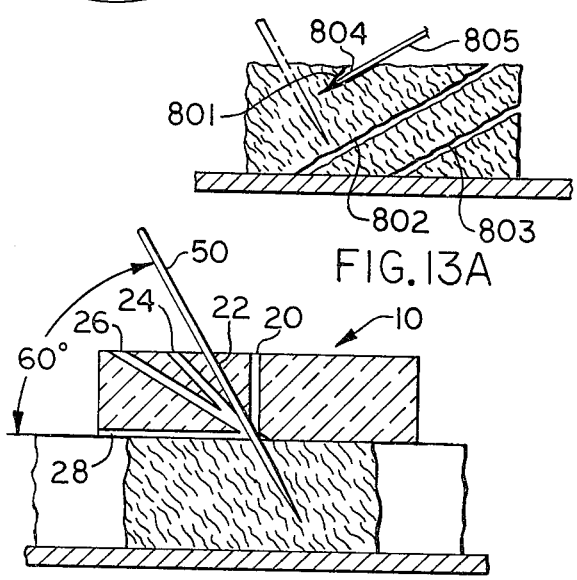
FIG. 13A
FIG. 13

MEAT GRAIN TEMPLATE

BACKGROUND OF THE INVENTION

This invention relates generally to a three-dimensional template for directing a marker into an object at a predetermined angle, and in particular to a template for determining the grain direction of meat.

It is well known that a given piece of meat, such as a Blade Chuck (full URMIS name, Beef Chuck, Blade Chuck; name of primal cut section, followed by name of retail cut), for example, consists of sections which vary in quality from the popular Rib Eye to the less desirable Inner Cap. It is also known to chefs, and other experts in the preparation of meat, that the eating quality, tenderness and palatability of meat is much improved by proper cutting and slicing. In general, the improvement is provided by cutting the meat, before or after cooking, across, rather than with the grain. Unfortunately, it is very difficult to determine the direction of the meat grain in many retail cuts of meat especially since, for most meats (muscles), there is no clear indication on the surface of the meat. And of course the problem is particularly difficult for housewives and others without special meat cutting skills. Meat sellers make a substantial additional charge for removing and selling individual muscles or sections of individual muscles in which cutting across the grain has already been done (for example, Top Blade or "Book" steaks) or can easily be done (for example, Eye of Round roasts).

SUMMARY OF THE INVENTION

This invention provides a systematic means of determining the direction of the grain of various cuts of meats and in particular provides a three-dimensional template which is used to guide a marker into position correctly locating the grain direction.

According to one aspect of the present invention the template includes a body having a lower face for contacting the meat and a plurality of passages inclined at selected angles to the lower face, each passage being substantially straight for receiving and directing a marker into the piece of meat.

In another aspect of the invention, the template includes a plurality of openings therein defining the upper end of said passages, and the passages include longitudinal axes defining a common plane intersecting the lower face of the body.

In yet another aspect of the invention, the template body includes substantially flat upper and lower faces disposed in spaced parallel relation to each other and the lower face includes a groove providing a passage having a longitudinal axis parallel to said face and in the same plane as the longitudinal axes of the other inclined passages.

In still another aspect of the invention the template body is a short cylindrical prism of transparent material having substantially flat upper and lower faces disposed in spaced parallel relation, the upper face including a plurality of openings defining the upper ends of said passages, one of said passage openings being coaxial with the cylindrical prism and the other passage openings being disposed radially outwardly of said opening, and the upper face of the body being divided into equal parts by circumferentially disposed indicia measured from a reference radius defined by said passage openings.

In yet another aspect of the invention the template body is a short cylindrical prism of transparent material having substantially flat upper and lower faces disposed in spaced parallel relation to each other, the upper face including a plurality of openings defining the upper ends of said passages, one of said passage openings being coaxial with said cylindrical prism and said other passage end openings being disposed radially outwardly of said coaxial opening in numerically equal sets, adjacent radial sets defining sectors on the upper face of the body dividing said upper face into circumferentially equal parts.

Still another aspect of the invention provides a method of cutting meat across the grain comprising the steps of turning the meat so that a reference surface, called the "face" is identified and placed so as to be easily marked by the operator; applying a grain marker to the meat section at a predetermined angle of inclination and at a predetermined horizontal angle, and cutting the meat into portions by making perpendicular cuts relative to the marker.

BRIEF DESCRIPTION OF THE DRAWINGS

FIG. 1 is a top plan view of a meat grain template;

FIG. 2 is a cross sectional view taken on line 2—2 of FIG. 1 illustrating the passages therethrough;

FIG. 3 is a fragmentary end elevational view of the template;

FIG. 4 is a top plan view of a modified template;

FIG. 5 is a cross sectional view taken on line 5—5 of FIG. 4;

FIG. 6 is a top plan view of another modified template;

FIG. 7 is a cross sectional view taken on line 7—7 of FIG. 6 illustrating the passages through the modified template;

FIG. 8 is a top plan view of another modified template;

FIG. 9 is a cross sectional view taken on line 9—9 of FIG. 8 showing the passages therethrough;

FIG. 10 is a side elevational view of the template shown in FIG. 8;

FIG. 11 is a perspective view showing the manner of use of the meat grain template in connection with a specifice cut of meat such as Blade Chuck, "face" presented to operator, from a left side;

FIG. 12 is an enlarged fragmentary view of a particular portion of the meat, such as Subscapularis (SS), disclosed in FIG. 11;

FIG. 13 is a cross sectional view taken on line 13—13 of FIG. 12 with template in position;

FIG. 13A is a cross sectional view taken on line 13—13 of FIG. 12 with template removed;

DESCRIPTION OF THE PREFERRED EMBODIMENT

Figure 14:
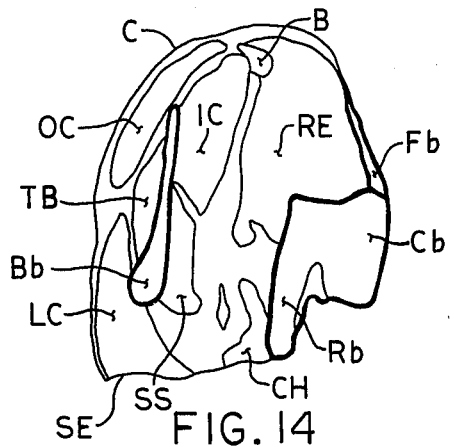
FIG. 14 is a schematic view of a Blade Chuck, roast or steak "face" surface.

Before proceeding to a description of the several species of meat grain template discussed in this application it is believed that it will be helpful to an understanding of the device and its use if certain terms used herein are defined with particularity.

Grain of meat

The main averaged functional lengthwise direction of the muscle fibers and internal connective tissue fibers within a muscle, or segment or section of a muscle.

Grain marker

A marker placed to demonstrate the direction of grain—usually placed parallel to the grain (long direction).

Cut of meat

The cuts of meat herein described are named according to the Uniform Retail Meat Identification System (URMIS) devised by the Industry-wide Cooperative Meat Identification Standards Committee of the National Livestock and Meat Board, 36 South Wabash Avenue, Chicago, Ill. 60603. These names are now designated as mandatory within many jurisdictions in the U.S.A. The retail cut names only have been used. Primal cut names have been omitted.

Names of portions, sections or segments of cuts

Common names and correct anatomical names are given. Common names are those widely used. In only one case, the Subscapularis muscle, which would translate from the Latin as "Underblade," is designated by inventor as the Subscap, to prevent confusion with the URMIS named Underblade Roast which includes the Subscapularis muscle and also includes other structures.

Meat cut names

Meat cut names are those of the URMIS system of named retail cuts of beef. Beef is the prototypical animal for which this device can be used; however, the anatomy of the other chief mammaliam meat animals (Veal, Calf, Buffalo, Beefalo, Lamb, Sheep, Pig) is so closely similar that the methods and charts used herein apply equally well to equivalent anatomical structures. Where cuts are made differently in Beef or other mammalian meat animals, suitable modifications based on the methods herein described are simple to make.

The "face" surface

The reference surface of a cut of meat that is oriented so as to present to the operator the meat sections on which the template is placed by the operator for marking the grain in accordance with specific directions.

The "reverse" surface

The reference surface of a cut of meat that is oriented so as to be approximately opposite to the "face" surface.

Referring now by reference numerals to the drawings and first to FIGS. 1 and 11 it will be understood that the meat grain template generally indicated by numeral 10 in FIG. 1 is intended to be used to indicate the direction of the grain of various portions of a piece of meat, such as the Blade Chuck indicated by numeral 12 in FIG. 11 to facilitate the cutting of the meat in a manner which will render it more tender for chewing and more palatable.

The template 10 of the preferred embodiment shown in FIG. 1 and related FIGS. 2 and 3 is of clear acrylic plastic material, although other materials such as wood, metal, rubber and also other plastic material could be used. The template has the configuration of a short cylindrical prism which constitutes a body having a flat upper face 14, a flat, parallel lower face 16 and an arcuate face 18. As shown, the template 10 includes a plurality of elongate passages 20, 22, 24 and 26 of circular cross section which are inclined to the lower face 16 at angles of 90°, 60°, 45°, and 30° respectively and extend between said upper face 14 and said lower face 16 said passages being of a size to receive a meat skewer of wood, metal, plastic or other suitable material. A horizontal passage 28 is provided in the lower face 16 of semi-circular cross section. Passage 20 is coaxial with the longitudinal axis of the cylindrical template 10 and in consequence includes an end opening 30 disposed at the center of upper face 14 of said template. Passages 22, 24 and 26 also include upper face end opening 32, 34 and 36 respectively, disposed radially outwardly of said coaxial opening 30, and the longitudinal axes of the passages 20–28 define a common plane perpendicular to the template lower face 16. The horizontal passage 28 also lies on the common plane and has an outer end opening 38 on the arcuate wall 18, as shown in FIG. 3. In the embodiment shown, all passages terminate at the lower end opening 40, of the vertical or 90° passage 20. The template 10 has a diameter greater than four times the distance between the upper and lower faces 14 and 16 to ensure that the 30° opening 36 is spaced from the upper corner to preclude corner breakage.

As clearly shown in FIG. 1, the template upper face 14 is provided with indicia in the form of pips 101–111 at equal intervals of 30° corresponding to the "hour" pips on a clock face. A pair of arrow-like pips 112 indicates the twelve "hour" reference line and a radial reference line between the center of these pips and the 90° passage 30 is defined by pips 114 which also define the solid areas between the upper end of passage openings 30, 32, 34 and 36. Before describing the manner of use of the template three modified embodiments will be briefly discussed.

FIGS. 4 and 5 illustrate a modified template 610 which is similar to template 10 except that the lateral approximately one-third on each side has been removed and the lower approximately 40% of the residual central one-third has also been removed to produce a smaller template having opposed sides 611, a lower end 613 and an arcuate upper end 618. Insofar as the passages are concerned the template is identical to that shown in FIGS. 1, 2 and 3 and for this reason identical parts are given the same reference numeral with a prefix 6 or 7 as the case may be.

FIGS. 6 and 7 illustrate another modified template 210 which is also a short cylindrical prism having a flat upper face 214, a parallel lower face 216 and an arcuate face 218. This template 210 also includes a single coaxial vertical passage 220 but provides a plurality of sets of elongate passages 222, 224 and 226 of circular cross section. These passages 222, 224 and 226 are inclined to the lower face 16 at angles of 60°, 45° and 30° respectively and are arranged in twelve radial sets 30° apart, each set corresponding to an "hour" radius of a clock face, each passage extending between said upper face 214 and said lower face 216. A plurality of horizontal passages 228 is provided in the lower face 216 each associated with a set of inclined passages. The end opening 230 of central passage 220 provides a center from which the inclined passage end openings 232, 234 and 236 radiate outwardly and the longitudinal axes of the passages 220-228 define a plurality of common planes perpendicular to the template lower face 216, all of said passages terminating at the lower end opening 240 of vertical passage 220. The radial sets of openings are arranged by way of example, but not limitation, at equal angular intervals of 30° about the upper face 214 and the end openings of passages of the same angle of inclination are connected by rings 240, (60°), 242 (45°) and 246 (30°). In this embodiment if radial sets of openings at other circumferential angles than 30° are to be used appropriate changes in the chart reference data described below would be required.

FIGS. 9 and 10 illustrate another modified template 410 which is of rectangular configuration rather than cylindrical configuration having opposed sides 411 and ends 413 and 418 as shown, and includes a flat upper face 414, and a parallel flat lower face 416. This template also includes a plurality of elongate passages 420, 422, 424 and 426 inclined to the lower face 416.

The passage arrangement is similar to that for template 10 in that it includes passages 420, 422, 424 and 426 inclined to the lower face 416 at angle of 90°, 60°, 45° and 30° respectively, said passages extending between the upper and lower faces 414 and 416. A horizontal passage 428 is provided and the longitudinal axes of said passages 420-428 define a common plane perpendicular to lower face 416. Passage upper end openings 432, 434 and 436 are disposed longitudinally outwardly of vertical passage end opening 420 to define a center reference line of the prism. The template upper face 414 is provided with identifying indicia in the form of a scribed circle 438 with its center at 430 and radius equal to 430-436 center to center, and scribed lines 501-511 at equal angular intervals of 30° corresponding to the "hour" pips on a clock face and can if desired be provided with pips (not shown). A pair of arrow-like pips 512 indicates the twelve "hour" reference line and a radial reference line between the center of these pips and the 90° passage 430 is defined by pips 514.

As will be described below the templates are used in conjunction with a chart bearing reference data. This information can be abbreviated and inscribed directly on the template. For example, on the upper surface and sides of the template 410 as shown in FIGS. 8 and 10, or on the upper surface and sides of template 10 and the sides of template 210 (not shown).

Template 210 does not require being rotated to a correct position after it is placed on the surface of the specific section of meat into which a grain marker is to be inserted. Template 410 has an approximate resemblance to certain types of clock hands and presents a relatively large surface upon which instructions to the operator can be inscribed, and read as the template is used. Template 610 has an approximate resemblance to certain types of clock hands, and requires a relatively small amount of material in its manufacture.

All of the templates 10, 210, 410 and 610 described above are used in essentially the same manner to locate the angle of inclination of the meat grain of a specific portion of meat, from a particular cut of meat. The use of the template is briefly described as follows.

The particular cut of meat with which it is to be used is oriented on a table in accordance with instructions provided by certain pre-recorded data, discussed below, associated with that particular piece of meat. Following this the template is oriented with respect to the meat in accordance with instructions provided by other pre-recorded data, contained on charts 1-7 below, relating to the horizontal angle of the template and the marker angle which is to be used.

Before proceeding to a more particular description of the manner of use of the template, the procedure used to identify and correctly orient the meat prior to use of the template will be described will reference to well-known cuts of meat.

As will be readily understood meat from animals such as beef cattle is associated with the right or left side of the animal. The orientation of the grain varies depending on whether a left or right side cut of the meat is being considered. It is also dependent on the correct "face" surface of the meat facing the operator on the work table. This is achieved by the use of identifying characteristics common to the particular piece of meat being considered. Eight typical cuts of meat are shown in FIGS. 14-30 with their chart related "face" surface uppermost. In FIG. 8 and FIGS. 14-30 heavily outlined areas indicate bone material.

The charts containing the instructional data with respect to the horizontal angle and angle of inclination of the meat grain are referenced to the particular "face" surface of the meat, which is defined above, and which is determined for various meat cuts in the following manner. In each case the left side cut is the one being considered, it being understood that the right side cut is a mirror image thereof.

Figure 15:
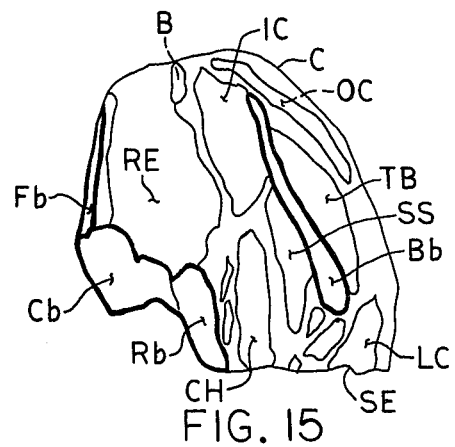
FIG. 15 is a schematic view of the "reverse" surface thereof.

FIGS. 14 and 15 are schematic views of a Blade Chuck roast "face" surface (caudal surface) and "reverse" surface (cranial surface) respectively. The various parts common name first, correct anatomical name in parentheses, and corresponding abbreviations are shown below.

C—Cover (outer fat and membrane)
CH—"Chuck" (Serratus ventralis)
IC—Inner Cap (Rhomboideus)
LC—Lower Cap (Latissimus dorsi)
OC—Outer Cap (Trapezius)
RE—Rib Eye (Longissimus dorsi, spinalis dorsi, multifidus dorsi, complexus)
SS—Underblade or Subscapular (Subscapularis)
TB—Top Blade (Infraspinatus)
MT—Mock Tender (Supraspinatus)
B—Backstrap (Ligamentum Nuchae)

Bb—Blade bone (Scapula)
Sb—7-Bone (Scapula)
Cb—Chine bone (Vertebra)
Fb—Featherbone (Spinous process of vertebra)
Rb—Rib bone In order to find the "face" surface the meat is placed on a flat horizontal surface such as a table with the straight cut edge (SE) disposed at the bottom, toward the operator. The size of the Top Blade meat (TB) is checked on the uppermost surface for size. The meat is then turned over so that the first surface is on the table and the size of the Top Blade (TB) meat again checked. The "face" is the surface with the smaller Top Blade (TB) meat (FIG. 14).

Figure 16:
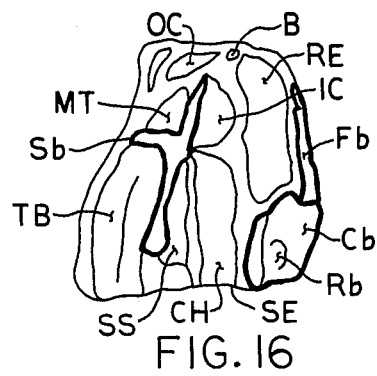
FIG. 16 is a schematic view of a 7-Bone Chuck roast or steak "face" surface, from a left side.
Figure 17:
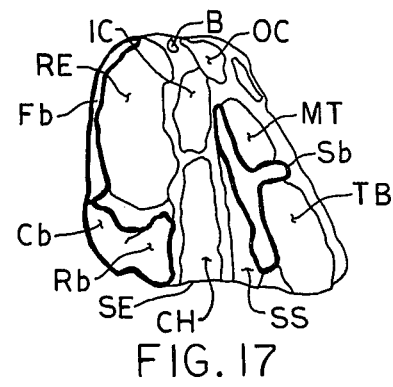
FIG. 17 is a schematic view of the "reverse" surface thereof.

FIGS. 16 and 17 are schematic views of a 7-Bone Chuck roast "face" surface (caudal surface) and "reverse" surface (cranial surface) respectively. The various parts and corresponding abbreviations are substantially identical to those shown for the Blade Chuck discussed above, except Blade bone (Bb) becomes 7-Bone (Sb) and Mock Tender (MT) appears. The "face" surface identifying procedure is substantially the same except that the Mock Tender (MT) size is used instead of the Top Blade (TB) size. The "face" surface is the surface with the smaller Mock Tender (MT) meat (FIG. 16).

| Chart No. 1 BLADE CHUCK and 7-BONE CHUCK roast or steak | | | |
| --- | --- | --- | --- |
|  | Left Sect. Rotation | Inclination Degrees | Right Sect. Rotation |
| CH—Chuck | 4 | 0 | 8 |
| TC—Inner Cap | 1 | 0 | 11 |
| LC—Lower Cap | 11 | 45 | 1 |
| OC—Outer Cap | 1 | 60 | 11 |
| RE—Rib Eye | 0 | 90 | 0 |
| SS — Subcap | 10 | 60 | 2 |
| TB—Top Blade | 11 | 60 | 1 |
| MT—Mock Tender | 1 | 45 | 11 |

Figure 18:
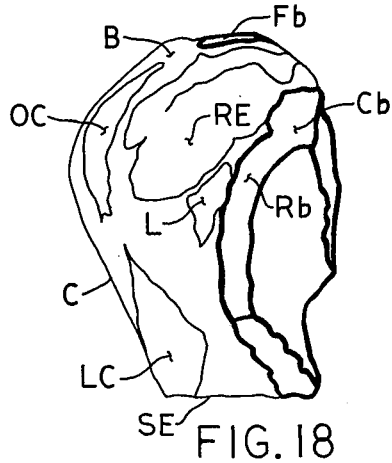
FIG. 18 is a schematic view of a Large End Rib roast or steak "face" surface, from a left side.
Figure 19:
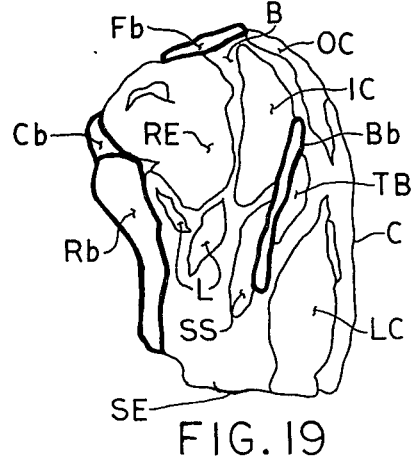
FIG. 19 is a schematic view of the "reverse" surface thereof.

FIGS. 18 and 19 are schematic views of a Large End Rib roast "face" surface (caudal surface) and "reverse" surface (cranial surface) respectively. The various parts and corresponding abbreviations are shown below.
Cb—Chine bone
Rb—Rib bone
Fb—Featherbone
RE—Rib Eye
C—Cover
L—Lip
RIC—Rib Inner Cap
SS—Subscap
OC—Outer Cap
LC—Lower Cap
B—Backstrap
Bb—Blade bone (cartilage)
TB—Tob Blade
L—Lip (longissimus costarum and serratus dorsalis)

In order to find the "face" surface the meat is placed on the table with the straight cut edge (SE) at the bottom, toward the operator, Cover (C) to one side, either right or left, and the rib bone (Rb) on the other side. The largest single section of meat is the Rib Eye (RE) which is noted for size.

The meat is then turned over and the size of the Rib Eye (RE) again noted. The "face" surface is the surface with the larger Rib Eye (RE) meat (FIG. 18). With the "face" surface up the roast is from a left beef half if the fat cover is on the left and from a right beef half if it is on the right.

| Chart No. 2 RIB LARGE END roast or steak | | | |
| --- | --- | --- | --- |
|  | Left Sect. Rotation | Inclination Degrees | Right Sect. Rotation |
| RIC—Rib Inner Cap | *1 (5) | 30 | *11 (7) |
| LC—Lower Cap | 11 | 45 | 1 |
| OC—Outer Cap | 1 | 60 | 11 |
| RE—Rib Eye | 0 | 90 | 0 |
| SS—Subscap | 10 | 60 | 2 |

*If the inner cap does not show on the face it can be marked from the reverse side at clock numbers shown in parentheses.

Figure 20:
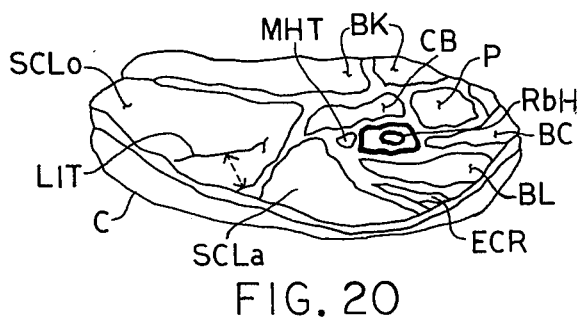
FIG. 20 is a schematic view of a Shoulder/Arm roast or steak "face" surface, from a left side.
Figure 21:
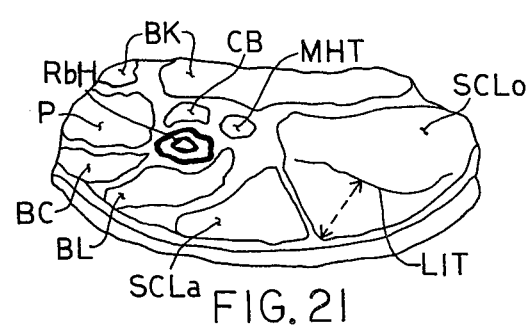
FIG. 21 is a schematic view of the "reverse" surface thereof.

FIGS. 20 and 21 are schematic views of a Shoulder/Arm roast "face" surface (distal surface) and "reverse" surface (proximal surface) respectively. The various parts and corresponding abbreviations are shown below.
C—Cover (outer fat and membrane)
LIT—Long internal tendon of Shoulder Clod
SCLo—Shoulder Clod (Triceps, capitis longus)
SCLa—Shoulder Clod (Triceps, capitis lateralis)
P—Pop-up (Biceps brachii)
RbH—Round bone (Humerus)
BK—Brisket (Pectoralis profundus and superficialis)
BC—Brachiocephalicus
BL—Brachialis
ECR—Extensor carpi radialis
CB—Coracobrachialis
MHT—Medial head of Triceps In order to find the "face" surface, the meat is placed on the table with the Cover (C) at the bottom toward operator. The Long Internal Tendon (LIT) of the largest segment of meat (SCLo) is located and the distance thereof from the lower corner of the Shoulder Clod largest segment of meat (SCLo) is noted. The meat is then turned over and the corresponding distance again noted. The "face" surface is the surface with the smaller dimension from the LIT to the lower Shoulder Clod (SCLo) corner.

| Chart No. 3 SHOULDER/ARM roast or steak | | | |
| --- | --- | --- | --- |
|  | Left Sect. Rotation | Inclination Degrees | Right Sect. Rotation |
| SC—Shoulder Clod | 0 | 90 | 0 |
| P—Pop-Up | 0 | 90 | 0 |
| BK—Brisket | 9 | 45 | 3 |
| BC—Branchiocephalicus | 10 | 45 | 2 |
| BL—Brachialis | 2 | 45 | 10 |
| ECR—Extensor Carpi Radialis | 4 | 45 | 8 |
| CB—Coracobrachialis | 11 | 45 | 1 |
| MHT—Medial Head of Triceps | 10 | 60 | 2 |
| *Superficial Brisket (SBK) (Pectoralis Superficicialis) | 5 | 30 | 7 |
| *"Chuck" rib meat (CH) (Serratus ventralis) | Serratus (TM) 9 | 45 | 3 |
| *I Major Teres major | 3 | 30 | 9 |
| *Subscap (SS) Subscapularis Deltoid (D) | 3 | 30 | 9 |

-continued
Chart No. 3 SHOULDER/ARM roast or steak

|  | Left Sect. Rotation | Inclination Degrees | Right Sect. Rotation |
|---|---|---|---|
| (Deltoideus) | 4 | 60 | 8 |

The above asterisked notations are for Shoulder/Arm meats (muscles) found in Shoulder/Arm cuts that extend further laterally or are made more proximally (not shown on drawings)

Figure 23:
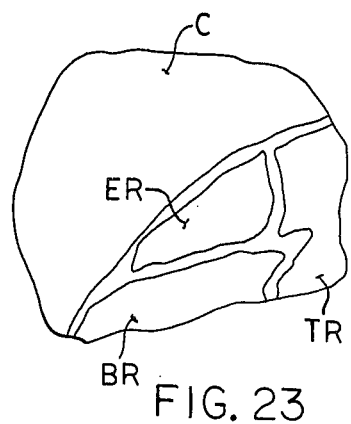
FIG. 23 is a schematic view of the "outer" surface thereof.
Figure 22:
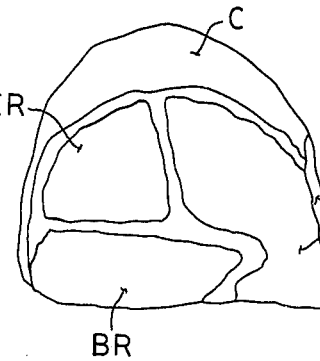
FIG. 22 is a schematic view of a Rump roast or steak "face" surface, from a left side.
Figure 24:
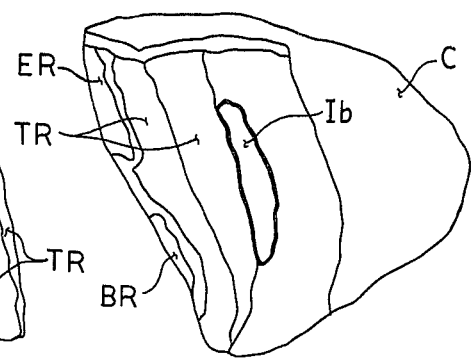
FIG. 24 is a schematic view of the "inner" surface thereof.

FIGS. 22, 23 and 24 are schematic views of a Rump Roast "face" surface (distal surface), external or "outer" view (lateral-distal) and internal or "inner" view (medial-distal). The various parts and corresponding abbreviations are shown below.

C—Cover (outer fat and membrane)
ER—Eye of Round (Semitendinosus)
TR—Top Round (Semimembranosus)
BR—Bottom Round (Biceps femoris)
IB—"Aitch" bone (Ischium)

In order to find the "face" surface, the meat is placed on the table with the Cover (C) up so that it looks like a hill. There are two meat surfaces, one with a bone $2\frac{1}{2}''-4\frac{1}{2}''$ long and the other all meat. The "face" surface is the surface that is all meat. The Eye of Round (ER) is on the left in a left cut and on the right in a right cut.

Chart No. 4 RUMP roast

|  | Left Sect. Rotation | Inclination Degrees | Right Sect. Rotation |
|---|---|---|---|
| ER—eye of Round | 0 | 90 | 0 |
| TR—Top Round | 0 | 90 | 0 |
| BR—Bottom Round | 7 | 30 | 5 |

Figure 25:
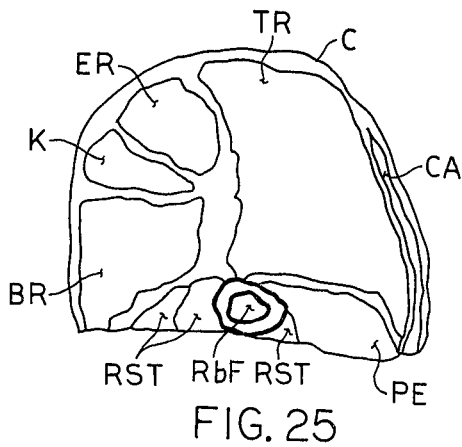
FIG. 25 is a schematic view of a Round roast or steak "face" surface, from a left side.
Figure 26:
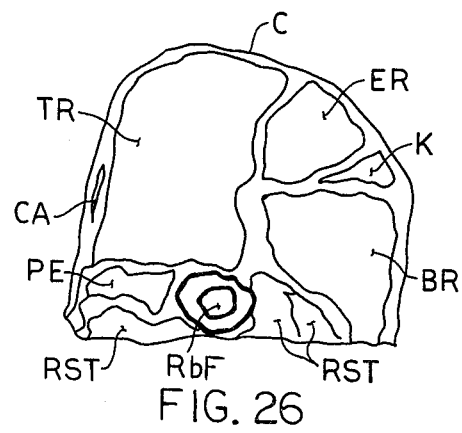
FIG. 26 is a schematic view of the "reverse" surface thereof.

FIGS. 25 and 26 are schematic views of a Round roast "face" surface (distal surface) and "reverse" surface (proximal surface). The various parts and corresponding abbreviations are shown below.

C—Cover (outer fat and membrane)
RbF—Round bone (Femur)
Tr—Top Round (Semimembranous)
ER—Eye of Round (Semitendonosus)
BR—Bottom Round (Biceps Femoris)
K—Kernel (Ischial head of biceps femoris)
RST—Round (Sirloin) Tip (Vastus medialis, intermedius and lateralis)
CA—Cap (Gracilis) (Not present near Rump, or may be trimmed off by meatcutter)
PE—Pectiueus In order to find the "face" surface, the meat is placed on the table with the round bone (RbF) and straight cut edge (SE) at the bottom toward operator. The size of the Kernel (K) on the uppermost surface is noted. The meat is then turned over and the size of the Kernel (K) again noted. The "face" surface is the surface with the larger kernel (K). With the "face" surface up, the Roast is from a left beef half if the Eye of Round (ER) is on the left and from the right beef half if the Eye is on the right.

Chart No. 5 ROUND roast or steak

|  | Left Sect. Rotation | Inclination Degrees | Right Sect. Rotation |
|---|---|---|---|
| TR—Top Round | 0 | 90 | 0 |
| ER—Eye of Round | 0 | 90 | 0 |
| BR—Bottom Round | 7 | 30 | 5 |
| K—Kernel | 8 | 60 | 4 |
| PE—Pectineus | 10 | 60 | 2 |
| RST—Round (Sirloin) Tip | 0 | 90 | 0 |
| CA—Cap | 5 | 60 | 7 |

Figure 27:
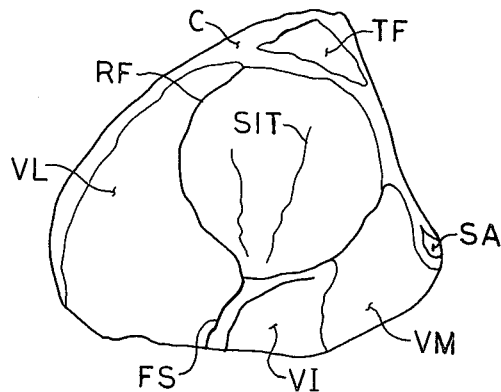
FIG. 27 is a schematic view of a Round (Sirloin) Tip roast or steak "face" surface, from a left side.
Figure 28:
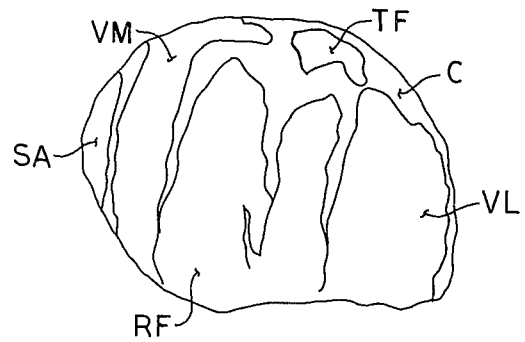
FIG. 28 is a schematic view of the "reverse" surface thereof.

FIGS. 27 and 28 are schematic views of a Round (Sirloin) Tip roast "face" surface (proximal surface) and "reverse" surface (distal surface). The various parts and corresponding abbreviations are shown below.

C—Cover (outer fat and membrane)
TF—Triangle (Tensor fascia lata)
RF—Rectus Femoris
SA—Sartorius
VL—Vastus Lateralis
VM—Vastus Medialis
VI—Vastus Intermedius
SIT—Straight Internal Tendon of rectus femoris
FS—Fat Streak between vastus lateralis and vastus intermedius In order to find the "face" surface, the meat is placed on the table so that the Cover (C) is uppermost and the amount of meat area noted. The meat is then rotated 180° and the amount of the meat area again noted. The "face" surface is the surface with the larger meat area (FIG. 15).

With the "face" surface up the Straight Internal Tendon (SIT) in the largest and most prominent central muscle (RF) points to the Fat Streak (FS) running down to one side. The roast is from a left beef half when the overall direction of the downward pointing Straight Internal Tendon (SIT) is to the left, and from a right beef half when the overall direction is to the right.

Chart No. 6 ROUND (SIRLOIN) TIP roast or steak

|  | Left Sect. Rotation | Inclination Degrees | Right Sect. Rotation |
|---|---|---|---|
| RF—Rectus Femoris | 6 | 60 | 6 |
| SA—Sartorius | 0 | 90 | 0 |
| TF—Triangle | 0 | 90 | 0 |
| VI—Vastus Intermedius | 6 | 45 | 6 |
| VL—Vastus Lateralis | 6 | 45 | 6 |
| VM—Vastus Medialis | 6 | 45 | 6 |

Figure 29:
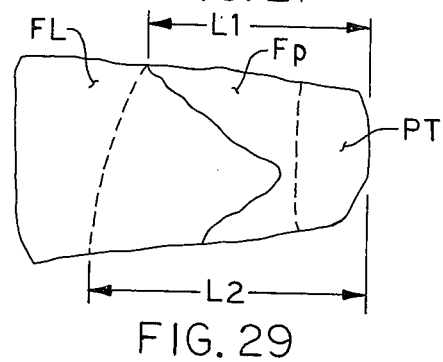
FIG. 29 is a schematic view of a Brisket roast "face" surface, from a left side.
Figure 30:
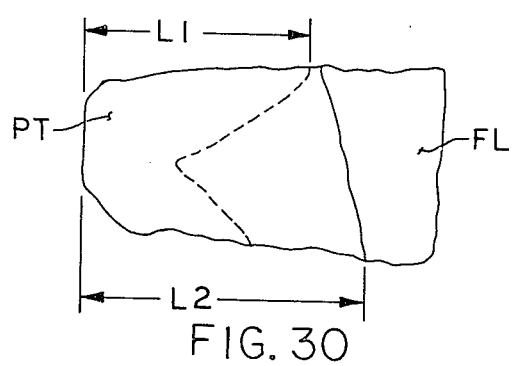
FIG. 30 is a schematic view of the "reverse" surface thereof.

FIGS. 29 and 30 are schematic views of a Brisket roast "face" surface (medial surface) and "reverse" surface (lateral surface). The various parts and corresponding abbreviations are shown below.

PT—Point (Pectoralis Superficialis)
FL—Flat (Pectoralis Profundus)
Fp—Fat Pocket In order to find the "face" surface, the meat is placed on the table so that the outline has the appearance of a truncated letter A lying on its side; the truncated part (top) of the A is to the operator's right. The meat is observed to see if there is a Fat Pocket (Fp), or a depression indicating that the Fat Pocket (Fp) has been removed, about 3-4 inches from the right edge. If there is, then this is the "face" surface. If there is not a Fat Pocket or depression, and the surface is relatively flat, it is the "reverse" surface: the meat must be turned over keeping the truncated part (top) of the A to the right.

Along the top (upper leg of the truncated A) the Point meat, which has its thick part in the right margin of the roast, extends to the left a variable distance. The linear extent of this meat segment is to be noted (L1). Then along the bottom (lower leg of truncated A) the linear extent to the left of this same muscle (Point) is noted (L2). If the top linear measurement is shorter, the roast is from a left beef half. If the top linear measurement (L1) is longer, the roast is from a right beef half and, for proper orientation for grain marking, is to be rotated 80°.

| Chart No. 7 BRISKET roast | | | |
|---|---|---|---|
| | Left Sect. Rotation | Inclination Degrees | Right Sect. Rotation |
| PT—Point (Pectoralis Superficialis) | 12* | 0 | 12** |
| FL—Flat (Pectoralis Profundis) | 2+ | 0 | 10++ |

*Changes from 1 to 11 from right (anterior) to left (posterior).
**Changes from 11 to 1 from left (anterior) to right (posterior).
+Changes from 2:30 to 1:30 from right (anterior) to left (posterior).
++Changes from 9:30 to 10:30 from left (anterior) to right (posterior).

The use of the template will be illustrated with respect to template 10, and embodiment shown in FIGS. 1–3, and with respect to a left Blade Chuck roast C shown in enlarged detail in FIG. 11.

The Blade Chuck roast C is made up of a plurality of individual meat (muscle) sections namely, Rib Eye (RE), Top Blade (TB); Subscap (SS); Inner Cap (IC); Lower Cap (LC) and Outer Cap (OC). The grain of each section has been predetermined with respect (1) to angle of inclination and (2) location that is the horizontal angle of rotation at which the meat grain is inclined at the angle shown. This information is recorded on Chart No. 1.

For example, with respect to the Subscap (SS) the chart shows Left Section Rotation "10" and Inclination Degrees "60". This means that the angular rotation is 10 o'clock relative to the hypothetical "X" (12 o'clock–6 o'clock) and "Y" (3 o'clock–9 o'clock) axes and the angle of inclination of the grain is 60°.

In order to mark this angle of inclination, the template 10 is positioned on the Subscap (SS) with the 90° passage 20 over the Subscap (SS) section (preferred position is approximately centered on Subscap (SS) section) as shown in enlarged FIG. 12 and the reference line, defined by the passage end openings and indicators 114, is rotated to the 10 o'clock position. In this position a grain marker 50, in the form of a meat skewer small enough in diameter to pass through passage 22, long enough to firmly embed in the meat, is inserted within passage 22 corresponding to the 60° inclination and pushed into the meat so that it becomes firmly embedded. When this is done the marker 50 is aligned with the meat grain as shown in FIG. 13. The template 10 is then easily removed by sliding it inclinedly upwardly away from the meat C and the same procedure repeated for the other meat sections, i.e. Rib Eye (RE), Top Blade (TB), Inner Cap (IC), Lower Cap (LC) and Outer Cap (OC). With respect to the Inner Cap (IC) it will be observed that the chart shows the angle of inclination of the grain as 0 at a rotation of 11 o'clock, i.e. 11-0. The procedure in this case is varied from that described above in that, after the template 10 is disposed on the meat with the reference line at 11 o'clock, a marker 50 is disposed within the horizontal passage 28. In effect, this means that the grain marker is lying on the face of the meat. A second similar grain marker 50' is therefore pushed into the meat horizontally just below the first grain marker at the same rotation angle.

The various sections RE,TB,IC,LC and OC are shown grouped about the Blade Chuck roast C in pictorial fashion together with the corresponding chart data.

With respect to the Rib Eye (RE) Chart No. 1 shows a Left Section Rotation of 0 o'clock and the angle of inclination of the grain as 90°, i.e. 0-90. Accordingly, the template 10 is disposed on the meat without regard to the alignment of any reference line on the face of the template and the grain marker is inserted into passage 20, that is to say vertically.

When all of the grain markers have been placed in position the Blade Chuck roast C can be separated into its various component sections in the normal manner, as by cutting. Then, the particular section, for example the Subscap (SS) can be cut perpendicularly, across the grain, by cuts 801, 802 and 803 with the knife edge 804 of knife blade 805, as shown in FIG. 13A.

FIG. 11 shows representative positioning and corresponding identifying data for the above cuts of meat and also, by way of example for Outer Cap (OC), Top Blade (TB), Lower Cap (LC), Rib Eye (RE) and Inner Cap (IC).

Template 210 provides a means of achieving the same result as described above in a somewhat different way. With this template, since sets of reference lines are defined by the radially aligned end openings, it is only necessary to lay the template in place with two diametrically opposed reference lines pointing north and south. When this is done there is a reference line at each 30° interval corresponding to the hour positions of a clock face, and, in the case of the Subscap (SS), for example, it is merely a matter of inserting the grain marker 50 at the 10 o'clock radius, in the 60° inclined passage. The remaining procedure is then exactly as outlined above.

In the case of the template 410, the procedure is substantially the same as described above with respect to template 10. The reference lines 401–411 are used only for assisting the operator to visualize a large clock face on the upper surface 414 of template 410, centered about the 90° passage 420. The template is simply laid on the meat section (muscle) with the 90° passage 420 approximately centered, and the single reference line defined by pips 514 is rotated about the 90° passage 420 until pips 512 of the relatively elongate prism are pointing, in the case of Subscap (SS), in the estimated direction of 10 o'clock. Template 610 is used in substantially the same manner as template 410. In all templates horizontal passages 238,438 and 638 are semi-circular.

As will be readily understood the other charts, Chart Nos. 2–7 contain corresponding information for determining the inclination of the meat grain for other cuts of meat as follows: Chart No. 2, Rib Large End roast or steak; Chart No. 3, Shoulder/Arm roast or steak; Chart No. 4, Rump roast; Chart No. 5, Round roast or steak; Chart No. 6, Round (Sirloin) Tip roast or steak and Chart No. 7, Brisket roast. The meat grain is determined for each cut in exactly the same manner as described above with respect to the Blade Chuck roast (and 7-Bone Chuck roast) once the "face" surface of the meat and the right or left side origin have been determined, and is not believed to require further explanation.

It will be understood that occasionally, it may be desirable, or even necessary to insert markers from another surface, which has been defined, for convenience only, the "reverse" surface. Where this is to be done, markers can be placed, using a notation system in which the inclination single reading remains the same for the particular subsection (usually a single muscle or muscle group) but the "hour" rotation reading is changed to its "mirror" figure found across a diametrical line such as would extend from 9 o'clock to 3 o'clock on a clock face. A table of such conversions is given below:

To change "face" surface rotational reading to "reverse" surface rotational reading:

1 o'clock becomes 5 o'clock
2 o'clock becomes 4 o'clock
3 o'clock becomes 3 o'clock
4 o'clock becomes 2 o'clock
5 o'clock becomes 1 o'clock
6 o'clock becomes 12 o'clock
7 o'clock becomes 11 o'clock
8 o'clock becomes 10 o'clock
9 o'clock becomes 9 o'clock
10 o'clock becomes 8 o'clock
11 o'clock becomes 7 o'clock
12 o'clock becomes 6 o'clock.

I claim as my invention:

1. A meat grain template comprising:
   (a) a body including a lower face and a plurality of continuous wall passages inclined at selected angles having a vertical component relative to said lower face, and
   (b) each passage being substantially straight for receiving and directing a meat grain marker into a piece of meat disposed below the lower face.

2. A template as defined in claim 1, in which:
   (c) the body includes an upper face having a plurality of openings therein defining the upper end of said continuous wall passages.

3. A template as defined in claim 1, in which:
   (c) the passages are cylindrical and include longitudinal axes defining a common plane intersecting the lower face of the body.

4. A template as defined in claim 1, in which:
   (c) the body includes substantially flat upper and lower faces disposed in spaced parallel relation,
   (d) the passages are cylindrical and the upper face includes a plurality of openings defining the upper end of said passages, and
   (e) the passages include longitudinal axes defining a common plan perpendicular to the lower face of the body.

5. A template as defined in claim 4, in which:
   (f) the lower face of the body includes a groove providing a passage having a longitudinal axis parallel to said face and in the same plane as the longitudinal axes of said inclined cylindrical passages.

6. A meat grain template comprising:
   (a) a body including a lower face and a plurality of passages inclined at selected angles to said lower face,
   (b) each passage being substantially straight for receiving and directing a meat grain marker into a piece of meat disposed below the lower face,
   (c) the body being a short cylindrical prism of transparent material having substantially flat upper and lower faces disposed in spaced parallel relation,
   (d) the upper face including a plurality of openings defining the upper end of said passages,
   (e) one of said passage openings being coaxial with said cylindrical prism and the other passage openings being disposed radially outwardly of said coaxial opening, and
   (f) said passages including longitudinal axes defining a common plane perpendicular to the lower face of the body.

7. A template as defined in claim 6, in which:
   (g) the upper face of the body is divided into equal parts by circumferentially disposed indicia measured from a reference radius defined by said passage end openings.

8. A meat grain template comprising:
   (a) a body including a lower face and a plurality of passages inclined at selected angles to said lower face,
   (b) each passage being substantially straight for receiving and directing a meat grain marker into a piece of meat disposed below the lower face,
   (c) the body being a short cylindrical prism of transparent material having substantially flat upper and lower faces disposed in spaced parallel relation,
   (d) the upper face including a plurality of openings defining the upper end of said passages,
   (e) one of said passage openings being coaxial with said cylindrical prism and the other passage openings being disposed radially outwardly of said coaxial opening in equal sets, adjacent sets defining a sector, and
   (f) each set of passages defining a common plane perpendicular to the lower face of the body.

9. A template as defined in claim 8, in which:
   (g) the upper face of the body is divided into circumferentially equal parts by said sectors.

10. A template for marking a workpiece, the template comprising:
    (a) a body including a lower face and a plurality of continuous wall passages inclined at selected angles having a vertical component relative to said lower face, and
    (b) each passage being substantially straight for receiving and directing a marker into engagement with a workpiece disposed below the lower face.

11. A template as defined in claim 10, in which:
    (d) the passages are cylindrical.

* * * * *